US012811983B2

(12) United States Patent
Hsieh et al.

(10) Patent No.: US 12,811,983 B2
(45) Date of Patent: Nov. 24, 2026

(54) ROLE INFERENCE ON COMMUNICATION GRAPHS

(71) Applicant: Microsoft Technology Licensing, LLC, Redmond, WA (US)

(72) Inventors: Tsuwang Hsieh, Sammamish, WA (US); Ranveer Chandra, Kirkland, WA (US); Srikanth Kandula, Redmond, WA (US); Sathiya Kumaran Mani, Kirkland, WA (US); Santiago Martin Segarra, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 18/678,756

(22) Filed: May 30, 2024

(65) Prior Publication Data

US 2025/0373661 A1 Dec. 4, 2025

(51) Int. Cl.
*H04L 9/40* (2022.01)
*H04L 41/22* (2022.01)

(52) U.S. Cl.
CPC .............. *H04L 63/20* (2013.01); *H04L 41/22* (2013.01); *H04L 63/105* (2013.01)

(58) Field of Classification Search
CPC ........ H04L 63/20; H04L 63/105; H04L 41/22; G06N 3/0455; G06N 3/088; G06N 3/0895
See application file for complete search history.

(56) References Cited

U.S. PATENT DOCUMENTS

2018/0077175 A1* 3/2018 DiValentin .......... H04L 63/1425

OTHER PUBLICATIONS

Mani et al. "Securing Public Clouds using Dynamic Communication Graphs." Proceedings of the 22nd ACM Workshop on Hot Topics in Networks. Page and line numberings added. (Year: 2023).*
Wang et al. English translation of CN_115622950_A_I. (Year: 2023).*
"VMware NSX.", Retrieved From: https://www.vmware.com/products/nsx.html, 2024, 8 Pages.
"Zero Trust—The security paradigm for the modern organization", illumio, Retrieved From: https://www.illumio.com/ solutions/zero-trust, 2024, 8 Pages.
Cranor, et al., "The gigascope stream database.", IEEE Data Eng. Bull, 2003, pp. 27-32.

(Continued)

*Primary Examiner* — John M Macilwinen
(74) *Attorney, Agent, or Firm* — NovoTechIP International PLLC

(57) ABSTRACT

A data processing system implements receiving telemetry data from a plurality of nodes of a cloud-based computing environment; analyzing the telemetry data using a communication graph pipeline to generate a communication graph representing communication among the plurality of nodes of the cloud-based computing environment; analyzing the communication graph using a role inference pipeline to infer roles of the plurality of nodes of the cloud-based computing environment included in the communication graph and output inferred roles for the plurality of nodes; and performing one or more actions on the communication graph based on the inferred roles for the plurality of nodes.

20 Claims, 8 Drawing Sheets

(56) References Cited

OTHER PUBLICATIONS

Dalton, et al., “Andromeda: Performance, isolation, and velocity at scale in cloud network virtualization.”, 15th USENIX symposium on networked systems design and implementation (NSDI 18), Apr. 2018, pp. 373-387.
Ertl, Otmar, “Superminhash—A new minwise hashing algorithm for Jaccard similarity estimation.”, arXiv preprint arXiv:1706.05698, Jun. 18, 2017, 6 Pages.
Estan, et al., “Automatically inferring patterns of resource consumption in network traffic.”, Proceedings of the 2003 conference on Applications, technologies, architectures, and protocols for computer communications, Aug. 2003, pp. 137-148.
Evans, Bob, “Walmart CIO: We Picked Microsoft for Huge Cloud Deal to Accelerate Digital Transformation”, Jul. 18, 2018, 8 Pages.
Gember-Jacobson, et al., “OpenNF: Enabling innovation in network function control.”, ACM SIGCOMM Computer Communication Review, vol. 44, No. 4, Aug. 2014, pp. 163-174.
Guo, et al., “Role-oriented graph auto-encoder guided by structural information.”, Database Systems for Advanced Applications: 25th International Conference, DASFAA 2020, Jeju, South Korea, Sep. 24-27, 2020, Proceedings, Part II 25. Springer International Publishing, 2020, pp. 466-481.
Heimann, et al., “Regal: Representation learning-based graph alignment.” Proceedings of the 27th ACM international conference on information and knowledge management, Oct. 2018, pp. 117-126.
Henderson, et al., “Rolx: structural role extraction & mining in large graphs.”, Proceedings of the 18th ACM SIGKDD international conference on Knowledge discovery and data mining, Aug. 2012, 9 Pages.
Hubert, et al., “Comparing partitions.”, Journal of classification, vol. 2, 1985, pp. 193-218.
Jeh, et al., “Simrank: a measure of structural-context similarity.”, Proceedings of the eighth ACM SIGKDD international conference on Knowledge discovery and data mining, 2002, 11 Pages.
Jiao, et al., “A survey on role-oriented network embedding.”, IEEE Transactions on Big Data, vol. 8, No. 4, Jul. 18, 2021, pp. 1-20.
Jin, et al., “Axiomatic ranking of network role similarity.”, Proceedings of the 17th ACM SIGKDD international conference on Knowledge discovery and data mining, Jun. 10, 2011, 17 Pages.
Kandula, et al., “The nature of data center traffic: measurements & analysis.”, Proceedings of the 9th ACM SIGCOMM conference on Internet measurement, Nov. 2009, 8 Pages.
Kandula, et al., “What’s going on? Learning communication rules in edge networks.”, Proceedings of the ACM SIGCOMM 2008 conference on Data communication, Aug. 2008, pp. 87-98.
Koponen, et al., “Network virtualization in multi-tenant datacenters.”, 11th USENIX symposium on networked systems design and implementation (NSDI 14), Apr. 2014, pp. 203-216.
Lakhina, et al., “Mining anomalies using traffic feature distributions.”, ACM SIGCOMM computer communication review, vol. 35, No. 4, Aug. 2005, pp. 217-228.
Li, et al., “{FlowRadar}: A better {NetFlow} for data centers.”, 13th USENIX symposium on networked systems design and implementation (NSDI 16), Mar. 2016, pp. 311-324.
Lizorkin, et al., “Accuracy estimate and optimization techniques for SimRank computation.”, Proceedings of the VLDB Endowment, Aug. 2008, pp. 422-433.
Mani, et al., “Securing Public Clouds using Dynamic Communication Graphs.”, Proceedings of the 22nd ACM Workshop on Hot Topics in Networks, Nov. 2023, 8 Pages.
Pang, et al., “{CloudCluster}: Unearthing the functional structure of a cloud service.”, 19th USENIX Symposium on Networked Systems Design and Implementation (NSDI 22), Apr. 2022, pp. 1213-1230.
Perozzi, et al., “Deepwalk: Online learning of social representations.”, Proceedings of the 20th ACM SIGKDD international conference on Knowledge discovery and data mining, Jun. 27, 2014, 10 Pages.
Pfaff, et al., “The design and implementation of open {vSwitch}.”, 12th USENIX symposium on networked systems design and implementation (NSDI 15), May 2015, pp. 117-130.
Rawashdeh, et al., “Similarity Measure for Social Networks—A Brief Survey.”, Maics, 2015, 7 Pages.
Ribeiro, et al., “struc2vec: Learning node representations from structural identity.”, Proceedings of the 23rd ACM SIGKDD international conference on knowledge discovery and data mining, Jul. 3, 2017, 10 Pages.
Roy, et al., “Inside the social network’s (Datacenter) network.”, Proceedings of the 2015 ACM Conference on Special Interest Group on Data Communication, Aug. 2015, pp. 123-137.
Singh, et al., “Packet classification using multidimensional cutting.”, Proceedings of the 2003 conference on Applications, technologies, architectures, and protocols for computer communications, Aug. 2003, pp. 213-224.
Tsourakakis, et al., “Scalable motif-aware graph clustering.”, Proceedings of the 26th International Conference on World Wide Web, Apr. 2017, pp. 1451-1460.
Tu, et al., “Deep recursive network embedding with regular equivalence.”, Proceedings of the 24th ACM SIGKDD international conference on knowledge discovery & data mining, Aug. 2018, 10 Pages.
“Akamai Guardicore Segmentation”, Retrieved From: https://www.akamai.com/products/akamai-guardicore-segmentation, 2024, 10 Pages.
“Azure Synapse Analytics”, Retrieved From: https://learn.microsoft.com/en-us/azure/synapse-analytics/, 2024, 4 Pages.
“Azure: Bandwidth Pricing.”, Retrieved From: https://azure.microsoft.com/en-us/pricing/details/bandwidth/, 2024, 8 Pages.
“All Networking Pricing”, Google Cloud, Retrieved From: https://cloud.google.com/vpc/network-pricing, 2024, 95 Pages.
“Cisco Adaptive Security Virtual Appliance (ASAv) Data Sheet”, CISCO, Retrieved From: https://www.cisco.com/c/en/us/products/collateral/security/adaptive-security-virtual-appliance-asav/adapt-security-virtual-appliance-ds.html, Jun. 16, 2021, 13 Pages.
“Cisco Tetration”, Retrieved From: https://www.cisco.com/c/en_sg/products/data-center-analytics/tetration-analytics/index.html, 2024, 28 Pages.
“Fast ICA”, Retrieved From: https://scikit-learn.org/stable/modules/generated/sklearn.decomposition.FastICA.html, 2024, 6 Pages.
“FortiGate-VM on Amazon Web Services”, Fortinet, Retrieved From: https://www.fortinet.com/content/dam/fortinet/assets/data-sheets/FortiGate_VM_AWS.pdf, 2024, 10 Pages.
“VPC Flow Logs.”, Retrieved From: https://cloud.google.com/vpc/docs/flow-logs, 2024, 32 Pages.
“Horizontal Pod Autoscaling”, Retrieved From: https://kubernetes.io/docs/tasks/run-application/horizontal-pod-autoscale/, 2024, 8 Pages.
“Intel® Tofino™ 2”, Retrieved From: https://www.intel.com/content/www/US/en/products/details/network-io/intelligent-fabric-processors/tofino-2.html#:~:text=Intel%C2%AE%20Tofino%E2%84%A2%202%20delivers%20up%20to%2012.8%20Tb,P4-programmable%20Ethernet%20switch%20ASICs., 2024, 3 Pages.
“Intel® Tofino™”, Retrieved From: https://www.intel.com/content/www/US/en/products/details/network-io/intelligent-fabric-processors/tofino.html, 2024, 4 Pages.
“Logging IP traffic using VPC Flow Log”, AWS, Retrieved From: https://docs.aws.amazon.com/vpc/latest/userguide/flow-logs.html, 2024, 18 Pages.
“Overview of Data Transfer Costs for Common Architectures”, AWS Architecture Blog, Retrieved From: https://aws.amazon.com/blogs/architecture/overview-of-data-transfer-costs-for-common-architectures/, 2024, 10 pages.
“Palo Alto Networks VM-Series Firewall.”, Retrieved From: https://docs.paloaltonetworks.com/vm-series, 2024, 8 Pages.
“Using NetFlow Filtering or Sampling to Select the Network Traffic to Track”, Retrieved From: https://www.cisco.com/c/en/us/td/docs/ios-xml/ios/netflow/configuration/15-mt/nf-15-mt-book/nflow-filt-samp-traff.pdf, 2024, 24 Pages.
“What Is an Advanced Persistent Threat (APT)?”., CISCO, Retrieved From: https://www.cisco.com/c/en/us/products/security/advanced-persistent-threat.html, 2024, 3 Pages.
Ahmed, et al., “Efficient graphlet counting for large networks.”, International conference on data mining. IEEE, 2015, 10 Pages.

(56) References Cited

OTHER PUBLICATIONS

Ahmed, et al., "Role-based graph embeddings.", IEEE Transactions on Knowledge and Data Engineering, vol. 34, No. 5, 2020, pp. 2401-2415.
Antonellis, et al., "Simrank++: Query rewriting through link analysis of the clickgraph (poster).", Proceedings of the 17th international conference on World Wide Web. Dec. 4, 2007, 25 Pages.
Arzani, et al., "{PrivateEye}: Scalable and {Privacy-Preserving} Compromise Detection in the Cloud.", 17th USENIX Symposium on Networked Systems Design and Implementation (NSDI 20), Feb. 2020, pp. 797-815.
Bahl, et al., "Towards highly reliable enterprise network services via inference of multi-level dependencies.", ACM SIGCOMM Computer Communication Review, vol. 37, No. 4, Aug. 2007, pp. 13-24.
Bailey, et al., "Walmart and Azure.", Microsoft Azure, Retrieved From: https://www.microsoft.com/en-us/research/wp-content/uploads/2016/09/Microsoft-Azure-The-Ultimate-Flexible-EnterpriseLevel-Solution.pdf, 2024, 32 Pages.
Ballani, et al., "Off by default!.", 2005, 6 Pages.
Bansal, et al., "Disaggregating stateful network functions.", 20th USENIX Symposium on Networked Systems Design and Implementation (NSDI 23), Apr. 2023, pp. 1469-1487.
Blondel, et al., "Fast unfolding of communities in large networks.", Journal of statistical mechanics: theory and experiment, Jul. 25, 2008, 12 Pages.
Bodík, et al., "Surviving failures in bandwidth-constrained datacenters.", ACM SIGCOMM Computer Communication Review, vol. 42, No. 4, 2012, pp. 431-442.
Broder, et al., "On the resemblance and containment of documents.", Proceedings. Compression and Complexity of SEQUENCES 1997 (Cat. No. 97TB100171). IEEE, 1997, 9 Pages.
Carbone, et al., "Apache flink: Stream and batch processing in a single engine.", The Bulletin of the Technical Committee on Data Engineering, vol. 38, No. 4, 2015, pp. 28-38.
Casado, et al., "Ethane: Taking control of the enterprise.", ACM SIGCOMM computer communication review, vol. 37, No. 4, Aug. 2007, pp. 1-12.
Cello, et al., "Traffic-aware clustering and VM migration in distributed data center.", Proceedings of the 2014 ACM SIGCOMM workshop on Distributed cloud computing, 2014, 4 Pages.
Chowdhury, et al., "Network virtualization: state of the art and research challenges.", IEEE Communications magazine, vol. 47, No. 7, Jul. 2009, pp. 20-26.
Cranor, et al., "Gigascope: A stream database for network applications.", Proceedings of the 2003 ACM SIGMOD international conference on Management of data, Jun. 2003, 5 Pages.
Devlin, et al., "BERT: Pre-training of Deep Bidirectional Transformers for Language Understanding", arXiv:1810.04805v2, May 24, 2019, 16 pages.
Firestone, et al., "{VFP}: A virtual switch platform for host {SDN} in the public cloud.", 14th USENIX Symposium on Networked Systems Design and Implementation (NSDI 17), Mar. 2017, pp. 315-328.
Firestone, et al., "Azure accelerated networking: {SmartNICs} in the public cloud.", 15th USENIX Symposium on Networked Systems Design and Implementation (NSDI 18), Apr. 2018, pp. 51-66.
He, et al., "Deep Residual Learning for Image Recognition", In Proceedings of the IEEE Conference on Computer Vision and Pattern Recognition, Jun. 27, 2016, pp. 770-778.
Iliofotou, et al., "Network Monitoring using Traffic Dispersion Graphs (TDGs)", In Proceedings of the 7th ACM SIGCOMM Conference on Internet Measurement, Oct. 24, 2007, pp. 315-320.
Kazwini, Hussein, "Flow logging for network security groups", Retrieved From: https://learn.microsoft.com/en-us/azure/network-watcher/network-watcher-nsg-flow-logging-overview, Mar. 19, 2024, 17 Pages.
Mirsky, et al., "Kitsune: An Ensemble of Autoencoders for Online Network Intrusion Detection", In Proceedings of 25th Annual Network and Distributed System Security Symposium, May 27, 2018, 15 Pages.
Mogul, et al., "Experiences with Modeling Network Topologies at Multiple Levels of Abstraction", In Proceedings of 17th USENIX Symposium on Networked Systems Design and Implementation, Feb. 25, 2020, pp. 403-418.
Renovate, et al., "Google Cloud Platform Microservices Demo.", Retrieved From: https://github.com/GoogleCloudPlatform/microservices-demo, 2024, 5 Pages.
Settles, Burr, "Active Learning Literature Survey", In Technical Report 1648 of Computer Sciences, University of Wisconsin—Madison, Jan. 9, 2009, 47 Pages.
Xu, et al., "Network-aware behavior clustering of Internet end hosts.", 2011 Proceedings INFOCOM, IEEE, 2011, pp. 2078-2086.
Zhang, et al., "Role-based network embedding via structural features reconstruction with degree-regularized constraint.", Knowledge-Based Systems 218, 2021, 9 Pages.
Zhao, et al., "Scalable tail latency estimation for data center networks.", 20th USENIX Symposium on Networked Systems Design and Implementation (NSDI 23), Apr. 2023, pp. 685-702.
"Advanced Persistent Threats.", Retrieved From: https://www.cisa.gov/topics/cyber-threats-and-advisories/advanced-persistent-threats., 2023, 7 Pages.
"Microsegmentation—Global Strategic Business Report", Research and Markets, Retrieved from https://www.researchandmarkets.com/report/microsegmentation, 2023, 8 pages.
Extended European Search Report Received in European Patent Application No. 25177097.0 mailed on Sep. 26, 2025, 12 pages.
Mani, et al., "Securing Public Cloud Networks with Efficient Role-based Micro-Segmentation", Proceedings of the 22nd USENIX Symposium on Networked Systems Design and Implementation, 2025, pp. 1033-1048.
Communication under Rule 71(3) EPC Received in European Patent Application No. 25177097.0 mailed on Sep. 18, 2026, 09 pages.

* cited by examiner

Role Inference Results

Metric: Adjusted Rand Index (ARI)

If answer perfectly matches ground-truth, ARI = 1.
If random, ARI = 0.
ARI < 0 ⇒ worse than random

| | Jaccard | SimRank | GAS | CloudCluster | Knowledge-Infused |
|---|---|---|---|---|---|
| Portal-Test | 0.47 ± 0.00 | 0.49 ± 0.01 | 0.50 ± 0.00 | 0.78 ± 0.00 | **0.88 ± 0.04** |
| Portal-Product | 0.37 ± 0.00 | 0.33 ± 0.00 | 0.50 ± 0.09 | 0.81 ± 0.00 | **0.85 ± 0.03** |
| K8s PaaS | **0.97 ± 0.00** | 0.93 ± 0.00 | 0.89 ± 0.00 | 0.78 ± 0.00 | 0.96 ± 0.01 |
| Service A | 0.40 ± 0.00 | 0.06 ± 0.00 | 0.16 ± 0.06 | 0.50 ± 0.00 | **0.63 ± 0.05** |
| Service B | 0.55 ± 0.00 | 0.60 ± 0.00 | 0.33 ± 0.14 | 0.72 ± 0.00 | **0.75 ± 0.02** |
| Service C | 0.32 ± 0.00 | 0.10 ± 0.00 | 0.44 ± 0.06 | 0.73 ± 0.00 | **0.90 ± 0.03** |

FIG. 4

ROLE INFERENCE ON COMMUNICATION GRAPHS

BACKGROUND

A public cloud is a cloud computing environment in which computing services, including virtual machines (VMs), storage, databases, networking, software, analytics, and the like, are offered by third-party providers over the internet and shared between multiple customers or organizations who want to use them. A public cloud enables customers to utilize services and applications without having to own the computing resources required to run the services and applications locally. Cloud computing resources are typically allocated to customers according to a subscription which defines the numbers and types of resources allocated to a customer.

As more and more organizations transition their workloads to public clouds, finding ways to improve network security and optimize network communications for customers of cloud platforms has become increasingly important. Such improvements and optimizations could be facilitated by a comprehensive view of the workings of the communications amongst the resources within a subscription. However, it has been difficult to find a means of obtaining a suitable view of the communications within a subscription that does not adversely impact the cost and/or performance of the resources. Hence, there is a need for systems and methods of obtaining a comprehensive view of communications within a subscription that have minimal impact on the computing resources of the subscription.

SUMMARY

An example data processing system according to the disclosure includes a processor and a memory storing executable instructions. The instructions when executed cause the processor alone or in combination with other processors to perform operations including obtaining, at a role inference pipeline, a communication graph representing communication among a plurality of nodes of a cloud-based computing environment; analyzing the communication graph to generate a directed adjacency matrix using the role inference pipeline, the directed adjacency matrix providing a representation of an amount of network traffic between pairs of nodes of the plurality of nodes; analyzing the communication graph to generate a node features matrix using the role inference pipeline, the node features matrix providing a representation of additional information associated with the plurality of nodes of the cloud-based computing environment; analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix; analyzing the node features matrix using the role inference pipeline to reduce the dimensionality of the node features matrix by performing the linear dimensionality reduction procedure to obtain a reduced node features matrix that includes fewer dimensions than the node features matrix; concatenating the reduced adjacency matrix and the reduced node features matrix using the role inference pipeline to generate a concatenated activity matrix; providing the concatenated activity matrix as input to an autoencoder to obtain embeddings, the autoencoder being trained to reduce the dimensionality of the concatenated activity matrix to generate the embeddings; and generating inferred roles for the plurality of nodes using the role inference pipeline by analyzing the embeddings using a hierarchical agglomerative clustering algorithm.

An example method implemented in a data processing system includes obtaining, at a role inference pipeline, a communication graph representing communication among a plurality of nodes of a cloud-based computing environment; analyzing the communication graph to generate a directed adjacency matrix using the role inference pipeline, the directed adjacency matrix providing a representation of an amount of network traffic between pairs of nodes of the plurality of nodes; analyzing the communication graph to generate a node features matrix using the role inference pipeline, the node features matrix providing a representation of additional information associated with the plurality of nodes of the cloud-based computing environment; analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix; analyzing the node features matrix using the role inference pipeline to reduce the dimensionality of the node features matrix by performing the linear dimensionality reduction procedure to obtain a reduced node features matrix that includes fewer dimensions than the node features matrix; concatenating the reduced adjacency matrix and the reduced node features matrix using the role inference pipeline to generate a concatenated activity matrix; providing the concatenated activity matrix as input to an autoencoder to obtain embeddings, the autoencoder being trained to reduce the dimensionality of the concatenated activity matrix to generate the embeddings; and generating inferred roles for the plurality of nodes using the role inference pipeline by analyzing the embeddings using a hierarchical agglomerative clustering algorithm.

An example data processing system according to the disclosure includes a processor and a memory storing executable instructions. The instructions when executed cause the processor alone or in combination with other processors to perform operations including receiving telemetry data from a plurality of nodes of a cloud-based computing environment; analyzing the telemetry data using a communication graph pipeline to generate a communication graph representing communication among the plurality of nodes of the cloud-based computing environment; analyzing the communication graph using a role inference pipeline to infer roles of the plurality of nodes of the cloud-based computing environment included in the communication graph and output inferred roles for the plurality of nodes, the role inference pipeline utilizing adjacency information, node features, and partial labeling information to infer roles for the plurality of nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a table comparing the performance of the role inference techniques provided herein with current techniques.

DETAILED DESCRIPTION

Figure 1:
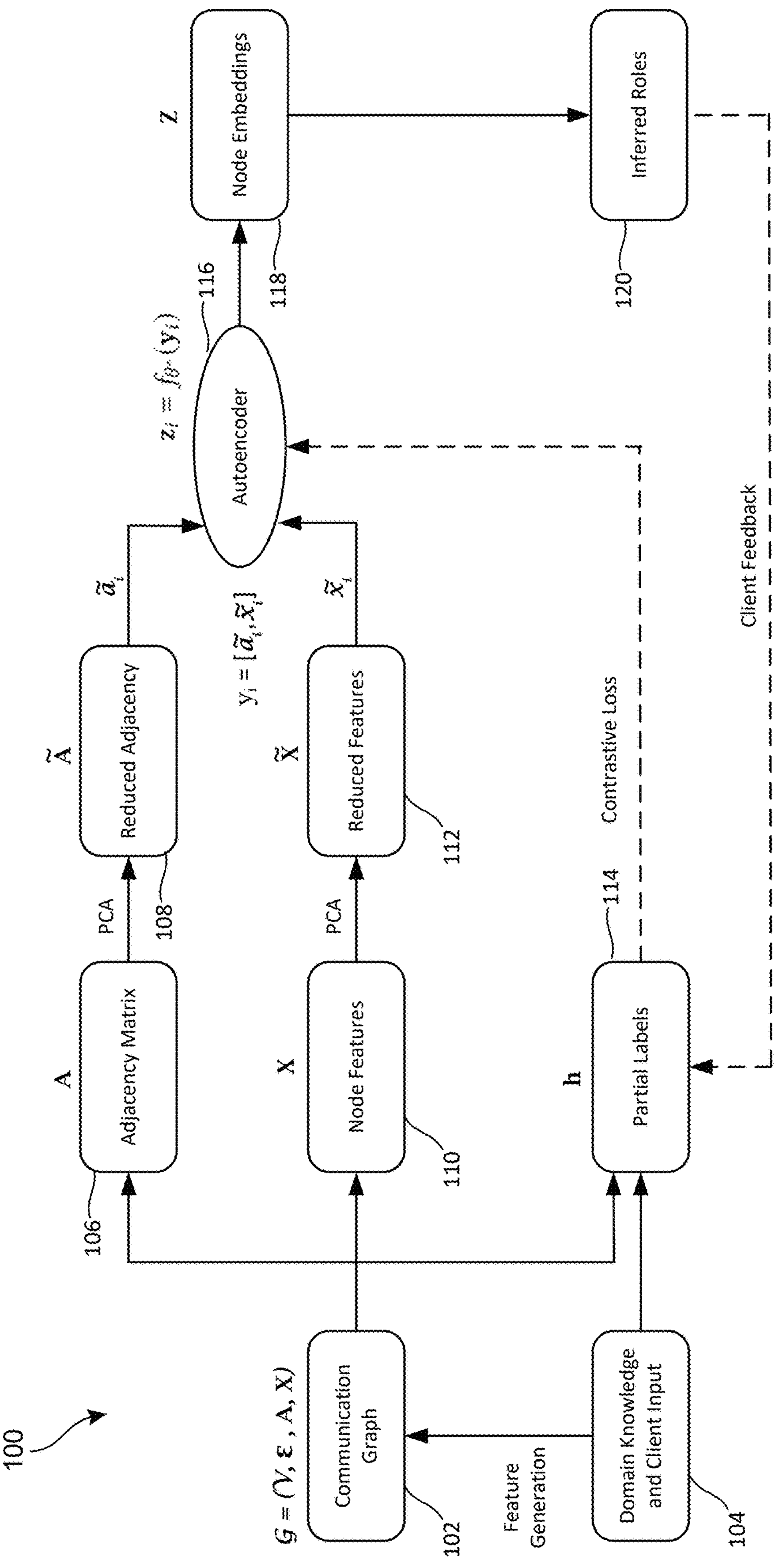
FIG. 1 is a diagram of an example role inference pipeline according to the techniques herein.

Systems and methods for providing role inference in communication graphs to provide improved visualizations of these graphs are provided herein. Communication graphs provide a visualization of communications among network elements of public cloud computing environments. A public cloud is a type of cloud computing service that delivers computing resources, such as virtual machines, storage, databases, and various application services, over the internet to multiple tenants using the same underlying infrastructure, also referred to as multi-tenancy. In this context, a "tenant" typically refers to an individual or organization (such as a company or customer) that uses the services and resources of a shared infrastructure but is logically isolated from other tenants. Tenants in turn can use the computing resources of the platform to provide various services and/or applications, such as web hosting, application development and deployment, data storage and backup, disaster recovery, big data analytics, and more.

A cloud computing platform allocates resources and/or services to tenants according to an agreement, such as a subscription, which defines the resources to be allocated, how the resources are to be allocated, and/or a pricing model (e.g., consumption-based, per-user, per-unit, etc.). The term "subscription" can also be used to refer to the logical grouping of resources which have been allocated to a tenant under a subscription. Tenants can have multiple subscriptions with each subscription corresponding to a different group of allocated resources. Securing the internal network of a subscription is important because even a single breached resource can open up access to many other resources in a subscription. However, one issue that has made it difficult to improve security and optimize network communications within a subscription is lack of communication visibility. A lack of communication visibility refers to an inability to obtain a comprehensive view of the workings of the communication network within a subscription, such as which resources are in communication with each other, when communications occur between resources, why communications occur, and the like.

Communication graphs provide a graphical representation of communications within a subscription on the public cloud computing platform. The communication graphs comprise nodes and edges. Each node corresponds to an Internet Protocol (IP) address of a component of the cloud-based platform, a service, a Kubernetes pod, or an IP-port tuple. Each edge represents communication between two nodes, such as but not limited to the number of packets, bytes, and/or connections. The communication graphs have three primary features. The graphs are complete, dynamic, and multi-faceted. The graphs capture all of the communication between the nodes. The graphs are dynamic and are updated to reflect continuous stream of telemetry received from the nodes of the cloud computing platform. The graphs are multi-faceted in that they are able to capture information in multiple time scales and different granularities to facilitate meaningful analysis and discovery of patterns in the telemetry data.

The communication graphs provide visibility into network communications within the subscription and provide comprehensive views of these network communications. However, a technical problem associated with the communication graphs is that the size and complexity of the resources associated with a subscription can result in expansive communication graphs. Consequently, visualizing and utilizing these communication graphs in an effective manner can be challenging. The techniques provided herein provide a technical solution to this problem by autonomously determining the role of nodes within communication graphs to significantly improve the clarity of visual representations for large-scale graphs. These techniques incorporate domain knowledge, as discussed in the examples which follow, into the role inference process to improve the visualizations of the communication graphs. A technical benefit of these techniques is that the communication graph can be visualized at the role level. As a result, administrators can focus the visualizations of the communication graph on specific components of the subscription to identify potential threats to improve network security and/or to optimize network performance.

Another technical benefit of these techniques is that the inferred roles of the nodes can be used to support micro-segmentation of the computing resources allocated to a tenant according to the tenant's subscription. Micro-segmentation, as used herein, is used to organize resources into micro-segments and to define policies which control how the resources in a micro-segment are able to communicate with resources in other micro-segments, if at all. This approach can be used to provide fine grained protection of resources within a subscription by limiting how far a breach of a component of the cloud-based computing environment can reach to the other components within the same micro-segment. A technical benefit of the role inference techniques provided herein is identifying components that have the same role and allocating these components to separate micro-segments. These and other technical benefits of the techniques disclosed herein will be evident from the discussion of the example implementations that follow.

FIG. 1 is a diagram of an example role inference pipeline 100. The role inference pipeline 100 receives a communication graph 102 as an input. The communication graph 102 represents network communications associated with a subscript to a cloud computing platform as discussed above. The role inference pipeline 100 analyzes the communication graph 102 and generates inferred roles based on the analysis performed on the communication graph 102. A goal of the role inference pipeline 100 is to leverage information in the communication graph 102 to cluster nodes into roles $\mathcal{R}$, where nodes in the same cluster have similar activity. These inferred roles can then be used to generate simplified visualizations of the communication graph 102 based on specific roles. The role inference pipeline 100 determines the inferred roles by applying a two-stage dimensionality reduction procedure that applies a linear dimensionality reduction procedure followed by a non-linear dimensionality reduction procedure as discussed below. The role inference pipeline 100 relies not only on node adjacency information (the adjacency matrix 106 in FIG. 1), but also on node feature information (node features 110 in FIG. 1), as well as partial labeling information (partial labels 114 in FIG. 1).

The communication graph 102 which can be expressed as the formula $\mathcal{G}=(\mathcal{V}, \varepsilon, A, X)$. $\mathcal{G}$ represents the communication graph 102, $\mathcal{V}$ represents a node set of cardinality $|\mathcal{V}|=N$ which contains all of the IP addresses in the network. A directed edge $\varepsilon$ exists between two nodes if traffic was measured from one node to the other, A represents a directed adjacency matrix, and X is a matrix of additional features. These elements are described in greater detail below.

The role inference pipeline 100 also receives domain knowledge and client input 104. The domain knowledge includes domain-inspired rules in some implementations that can be used to help infer the role of nodes. In a non-limiting example, rules may be associated with specific ports and/or specific names given to virtual machines associated with the nodes of the cloud-based computing system. The client input may also include feedback from the network administrator that identifies the roles of specific nodes. The domain knowledge and client input 104 may be used by the communication graph pipeline unit 340 described below to assist in generating the communication graph 102. The role inference pipeline 100 can also use the domain knowledge and client input 104 to generate the partial labels 114.

The role inference pipeline 100 determines an adjacency matrix 106 A based on the communication graph 102. The total amount of traffic is measured in bytes from node i to node j as entry $A_{ij}$ of the adjacency matrix $A=\mathbb{R}^{N\times N}$. The i-th row $$a_i^T$$

of the adjacency can be interpreted as features associated with node i capturing the total traffic that the node sent to every other IP address in the network. In operation 108, the role inference pipeline 100 performs principal component analysis (PCA) on the adjacency matrix A to generate a reduced adjacency matrix $\tilde{A}$. PCA reduces linear dimensionality of the adjacency matrix A while preserving important information from the original dataset. A technical benefit of this approach is that the adjacency matrix A may include noise and redundancies. Performing the PCA operation on the adjacency matrix A to obtain the reduced adjacency matrix $\tilde{A}$ can reduce or eliminate the impact of this noise when inferring roles. In some implementations, the PCA is performed by a singular value decomposition (SVD) of the adjacency matric A is performed to obtain the reduced adjacency matrix $\tilde{A}$ using a similar method as that used to obtain the reduced node features matrix $\tilde{X}$ discussed below.

The role inference pipeline 100 determines node features matrix X (node features 110) based on the communication graph 102. The matrix $X=\mathbb{R}^{N\times D}$ contains additional node features, where the i-th row $$x_i^T$$

collects D features associated with the node i. These additional features do not encode information by the total traffic sent between nodes, which is already encoded in the adjacency matrix A. The node features matrix X instead encodes information such as but not limited to the main ports used by the nodes, statistical information of the connections such as the mean and variance of bytes per connection or bytes per packet, the count of graphlets or motifs within the communication graph to which a given node belongs. In operation 112, the role inference pipeline 100 applies a PCA operation to the node features X to produce a reduced node features matrix X. A technical benefit of this approach is that the node features matrix X may include redundancies which can lead to a rank deficient matrix, and performing PCA on the node features matrix can reduce or eliminate the impact of this noise when inferring roles. In some implementations, the PCA is performed by a singular value decomposition (SVD) of $X=U\in V^T$ and keep on the top p components to form $\tilde{X}=U_p\Sigma_p$, where $U_p\in\mathbb{R}^{N\times p}$ contains the p leading (left) singular vectors and $\Sigma_p\in\mathbb{R}^{p\times p}$ is a diagonal matrix containing the corresponding single values. The value of p is selected such that the amount of variance that needs to be explained is greater than a pre-specified threshold. In a non-limiting example, a value of 99% is used.

In operation 116, a concatenation of the i-th rows of the reduced adjacency matrix $\tilde{A}$ and the reduced node features matrix $\tilde{X}$ is made, which can be represented by the following formula $y_i=[\tilde{a}_i, \tilde{x}_i]\in\mathbb{R}^{2p}$. This concatenation is referred to herein as the concatenated activity matrix and is provided as an input to an autoencoder which generates node embeddings 118. The autoencoder is regularized by a contrastive loss. To do this, the role inference pipeline 100 is assumed to have access to the true roles of a small subset of the nodes. This can be achieved by relying on domain-inspired rules, such as but not limited to specific ports associated with pre-established roles or names given to the virtual machines) or on feedback from the network administrator. This partial labeling heuristic is denoted as h: $\mathcal{V}\rightarrow\mathcal{R}\cup\emptyset$ such that $\hat{r}_i=h(i)$ is the estimated role of node i. In some instances, there may not be enough information to determine the role for a given node. In such instances, $\hat{r}_i=0$. $\mathcal{L}$ can be used to denote the set of nodes assigned some role label, i.e., $\mathcal{L}=\{i\in\mathcal{V}|\hat{r}_i\neq\emptyset\}$. The parametric encoder and decoder of the autoencoder are multi-layer perceptrons. The encoder can be denoted as $f_\theta$: $\mathbb{R}^{2p}\rightarrow\mathbb{R}^{d}$, while the decoder is denoted as $g_\psi$: $\mathbb{R}^{d}\rightarrow\mathbb{R}^{2p}$. The parameters $\theta$ and $\psi$ are then used to minimize the loss according to equation (1) below:

$$L(\theta, \psi) = \sum_{i\in\mathcal{V}}\|y_i - g_\psi(f_\theta(y_i))\|_2 - \alpha\sum_{r\in\mathcal{R}}\sum_{\substack{i,i'\in\mathcal{L}\\ h(i)=h(i')=r}}\log\left(\frac{\exp\left(sim(f_\theta(y_i), f_\theta(y_{i'}))/\tau\right)}{\sum_{i\in\mathcal{L}}\exp\left(sim(f_\theta(y_i), f_\theta(y_{i''}))/\tau\right)}\right) \quad (1)$$

In equation (1) above, sim is a pre-specified similarity measure in the embedding space (such as but not limited to cosine similarity), $\tau$ is a scalar temperature parameter, and $\alpha$ controls the relative weight between the terms of the loss. The first term in equation (1) is the classical autoencoder loss that seeks to minimize the difference between the input and the output while the second term pushes together the embeddings of nodes known to have the same role while separating those known to have different roles. The parameters that minimize the loss in equation (1) are denoted as $\theta^*$ and $\psi^*$. The embedding $z_i=f_{\theta^*}(y_i)$ provides a concise representation of the node i. These embeddings are gathered into the matrix $Z\in\mathbb{R}^{N\times d}$. The role inference pipeline 100 then applies a hierarchical agglomerative clustering algorithm to z to obtain the inferred roles in operation 120. The hierarchical agglomerative clustering algorithm is similar to that discussed in "CloudCluster: Unearthing the Functional Structure of a Cloud Service" by Pang et al. This example is intended to be non-limiting and other implementations can utilize other clustering algorithms.

The role inference pipeline 100 can solicit user feedback regarding the inferred roles obtained in operation 120. The inferred roles can be presented on a user interface of a client device of the user. The user interface provides a visualization of the inferred roles and input elements in which the user can provide feedback regarding whether the inferred roles are correct. The user feedback is used in a manner similar to active learning in which the user feedback is fed back into h, resulting in improved role inference by the role inference pipeline 100.

Figure 2:
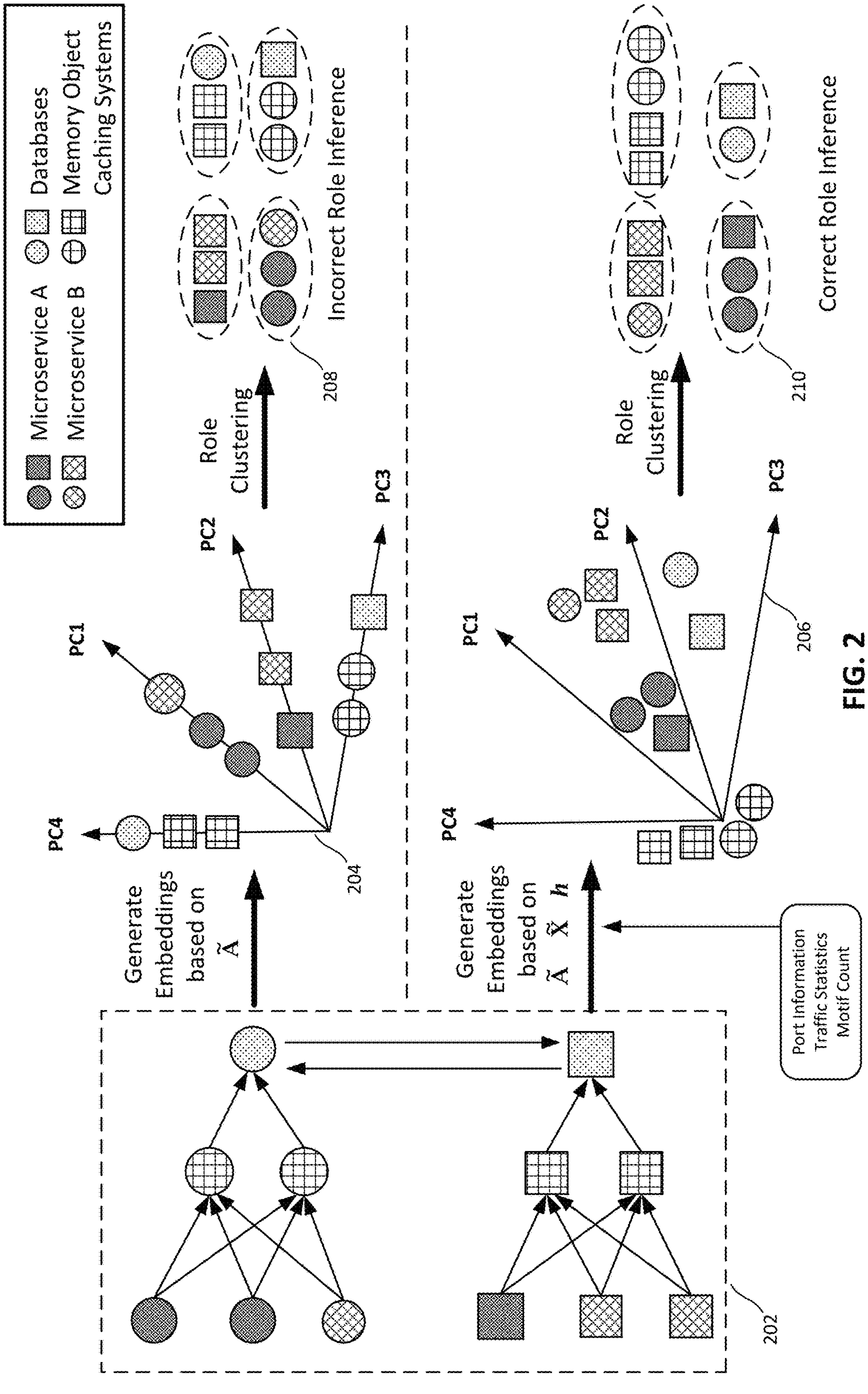
FIG. 2 is a diagram that demonstrates the value of domain knowledge in the role inference techniques provided herein by comparing the role inference techniques provided herein with a role inference technique that relies only on adjacency information for role inference.

FIG. 2 is a diagram that demonstrates the value of domain knowledge in the role inference techniques provided herein by comparing the role inference techniques provided herein with a role inference technique that relies only on adjacency information for role inference. The incorporation of domain knowledge through node features 110 and partial labels 114 leads to the correct inference of roles in the sample network 202 under study in this example. The sample network 202 includes twelve nodes (N=12). The sample network 202 includes two subnetworks. The nodes of the first subnetwork are represented by squares and the nodes of the second subnetwork are represented by circles. The nodes have been shaded with patterns according to their roles. Traffic originates from the nodes on the far left of each of the subnetworks and is relayed through middle layer of nodes of the respective subnetwork to the nodes on the far right of each subnetwork. The nodes on the far right are database. The nodes in the middle layer are memory object caching systems. The nodes in the right-most layer are associated with microservices.

The embeddings 204 are generated based on the adjacency matrix $\tilde{A}$ and the results of the role clustering 208 are based on the embeddings 204. The role of a respective node is inferred based on which other nodes with which the node has communicated. In this example, the node may communicate with one or more of the four types of nodes included in the sample network 202. As can be seen in FIG. 2, using only the adjacency information to infer the roles has resulted in incorrect role inferences. Such results are likely irrespective of the specific hierarchical clustering algorithm used to generate the adjacency matrix $\tilde{A}$.

The role inference techniques provided herein overcome the deficiencies associated with relying on adjacency information alone. The embeddings 206 are generated based on the reduced adjacency matrix $\tilde{A}$, the reduced node features matrix $\tilde{X}$, and the partial labels h. This approach resolves the undesirable outcome of incorrect role inference resulting from relying solely on the adjacency matrix $\tilde{A}$ by incorporating $\tilde{X}$ and h as discussed in the role inference pipeline 100 in the preceding examples. The role clustering 210 results in a correct role inference for the nodes of the sample network 202. In a non-limiting example, the incorporation of port-based features can help distinguish the nodes of microservices A from the nodes of microservice B. Additionally, the partial labels of the nodes of microservice A can help bring together the nodes associated with microservice A from the first and second subnetworks in the embeddings through the contrastive loss in equation (1). Partial labels associated with the other types of nodes can also provide similar improvements. As a result, the embeddings 206 are more informative than the embeddings 204, which were solely based on the adjacency matrix $\tilde{A}$.

Figure 3:
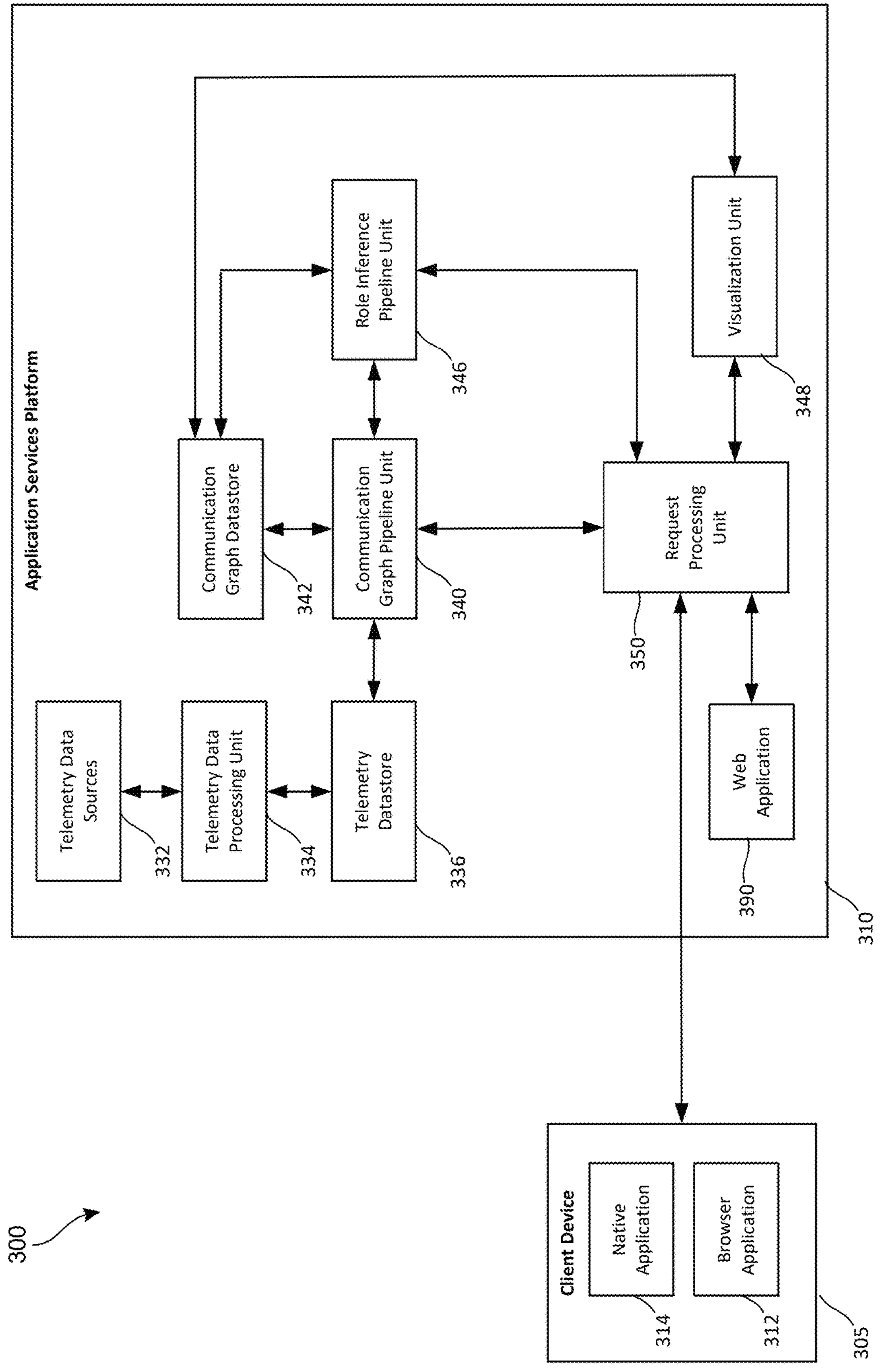
FIG. 3 is a diagram of an example computing environment in which the role inference techniques provided herein are implemented.

FIG. 3 is a diagram of an example cloud-based computing environment 300 in which the techniques described herein are implemented. The example cloud-based computing environment 300 includes a client device 305 and an application services platform 310. The application services platform 310 provides one or more cloud-based applications and/or provides services to support one or more web-enabled native applications on the client device 305. The client device 305 and the application services platform 310 communicate with each other over a network (not shown). The network may be a combination of one or more public and/or private networks and may be implemented at least in part by the Internet. The application services platform 310 can provide cloud-based services for multiple tenants as well as provide tools for monitoring the network traffic within the subscriptions associated with these tenants. These tools can utilize communication graphs to provide network administrators with insights into network communication among the various nodes associated with the subscription. These tools can utilize the role inference techniques provided herein to significantly improve the visual representation of these communication graphs to enable the administrators to better optimize the performance of and to secure their cloud subscription.

The application services platform 310 obtains telemetry data from the telemetry data sources 332. The telemetry data sources 332 are nodes of the application services platform 310 associated with a subscription of one or more subscribers. As discussed above, the nodes may be associated with an Internet Protocol (IP) address of a component of the application services platform 310, a service, a Kubernetes pod, or an IP-port tuple.

The telemetry data processing unit 334 receives telemetry data from the telemetry data sources 332 and stores the received telemetry data in the telemetry datastore 336. The telemetry datastore 336 is a persistent datastore in a memory of the application services platform 310. The telemetry datastore 336 is configured to facilitate analysis of the telemetry data, including generating communication graphs, refining the communication graphs using the role inference techniques disclosure herein, and/or generating visualizations based on the telemetry data, the communication graphs, and/or the refined communication graphs. In some implementations, the telemetry data processing unit 334 processes the telemetry data received from the telemetry data sources 332 to normalize data values and/or to format the telemetry data according to a standardized format that facilitates analysis of the telemetry data by the various components of the application services platform 310.

The request processing unit 350 receives requests from the native application 314 and/or the web application 390 to obtain various services from the application services platform 310. These requests can include requests to generate a communication graph, which are provided to the communication graph pipeline unit 340. These requests can also include requests to refine a communication graph based on inferred roles associated with the nodes included in a communication graph. Such requests are provided to the visualization unit 348, which can then request that the role inference pipeline unit 346 determine the inferred roles associated with the communication graph that has not already been processed by the role inference pipeline unit 346 and stored in the communication graph datastore 342.

The communication graph pipeline unit 340 generates communication graphs based on the nodes of the cloud-based computing environment provided by the application services platform 310. In tenant-based implementations, tenants are able to generate communication graphs associated with the computing resources allocated to that tenant under their subscription. The communication graph pipeline unit 340 can utilize various techniques for generating the communication graph. In some implementations, the communication graph pipeline unit 340 generates the communication graphs utilizing the techniques described in U.S. patent application Ser. No. 18/476,913, titled "Communication Visualization and Analytics System for Public Clouds" and filed on Sep. 28, 2023. The communication graph pipeline unit 340 can also use role information generated using the role inference pipeline 100 to micro-segment the nodes of the communication according to the micro-segmentation techniques described in U.S. patent application Ser. No. 18/476,913.

The communication graph pipeline unit 340 stores the communication graphs in the communication graph datastore 342. The communication graph datastore 342 is a persistent datastore in a memory of the application services platform 310. The communication graph datastore 342 enables the communication graph pipeline unit 340, the role inference pipeline unit 346, and/or other components of the application services platform 310 to access and/or query the data stored therein.

The role inference pipeline unit 346 implements the role inference pipeline 100 shown in FIG. 1 and discussed in the preceding examples. The role inference pipeline unit 346 can access communication graphs from the communication graph datastore 342 and analyze the communication graphs to perform the role inference techniques provided herein. The role inference pipeline unit 346 can analyze a communication graph in response to a request from the request processing unit 350, the communication graph pipeline unit 340, and/or the visualization unit 348. The role inference pipeline unit 346 can store inferred role information generated based on a communication graph in the communication graph datastore 342 to facilitate subsequent generation of visualizations by the visualization unit 348 based on that communication graph and/or a subset of the nodes based on the role information.

The visualization unit 348 generates visualizations of communication graphs or data derived therefrom that is stored in the communication graph datastore 342. The visualizations can be generated in response to a request received from the request processing unit 350 to generate visualization for the native application 314 of the client device and/or the web application 390 of the application services platform 310. The visualizations may be stored in the communication graph datastore 342 by the visualization unit 348. The visualization unit 348 can generate various graphical representation of the communication graphs that can be presented on a user interface of the native application 314 of the client device and/or the web application 390.

The client device 305 is a computing device that may be implemented as a portable electronic device, such as a mobile phone, a tablet computer, a laptop computer, a portable digital assistant device, a portable game console, and/or other such devices in some implementations. The client device 305 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 305, other implementations may include a different number of client devices that utilize services provided by the application services platform 310.

The client device 305 includes the native application 314 and a browser application 312. The native application 314 is a web-enabled native application, which in some implementations, implements an application for monitoring the status of the subscription, configuring resources associated with a subscription or subscriptions, requesting the generation of communication graphs and/or visualizations based on the communication graphs. The browser application 312 can be used for accessing and viewing web-based content provided by the application services platform 310. In such implementations, the application services platform 310 implements one or more web applications, such as the web application 390, for monitoring the status of the subscription, configuring resources associated with a subscription or subscriptions, requesting the generation of communication graphs and/or visualizations based on the communication graphs. The application services platform 310 supports both the native application 314 and a web application 390 in some implementations, and the users may choose which approach best suits their needs.

FIG. 4 is a table comparing the performance of the role inference techniques provided herein with current role inference techniques. The table shows the Adjusted Rand Index (ARI) between each role inference algorithm and the ground-truth role labels. The ARI is a measure of similarity between two data clusterings and is commonly used in role inference literature because the ARI is adjusted for chance. The ARI is bounded below −0.5 for highly discordant clusterings and 1.0 for identical clusterings. The ARI is close to 0.0 for random labeling regardless of cluster or sample size. The mean and standard deviation are reported across 10 runs for each experiment. The knowledge-infused role inference algorithm in the table refers to the role inference techniques provided herein.

FIG. 4 shows that the knowledge-infused role inference algorithm provided herein outperforms all baselines in all but one deployment. The average ARI of the knowledge-infused role inference algorithm provided herein is 0.83 while the average ARI of the best baseline is 0.72. This result demonstrates the effectiveness of the knowledge-infused role inference algorithm provided herein. There is only one deployment where this algorithm did not outperform the best baseline, the K8s PaaS deployment, in which the knowledge-infused role inference algorithm achieves an ARI of 0.96 compared to the best baseline's ARI of 0.97. However, this result can be explained by the labels of the K8s PaaS being partially derived from the Jaccard method, which makes the Jaccard method perform particularly well in this example deployment. Nonetheless, the knowledge-infused role inference algorithm still achieves a competitive ARI on this deployment.

CloudCluster consistently outperforms other baselines, particularly under the conditions of a noisy communication graph where more inflexible methods such as Jaccard struggle. Conversely, scenarios in which there is pronounced correlation between roles and neighbor similarities, such as in K8s Paas, demonstrate that traditional graph mining techniques like Jaccard, SimRank, and GAS show enhanced performance. This underscores the importance of incorporating domain-specific knowledge and client insights into the role inference processes, as varying deployment environments display distinct traits, and no single static algorithm can universally cater to all cases.

Figure 5:
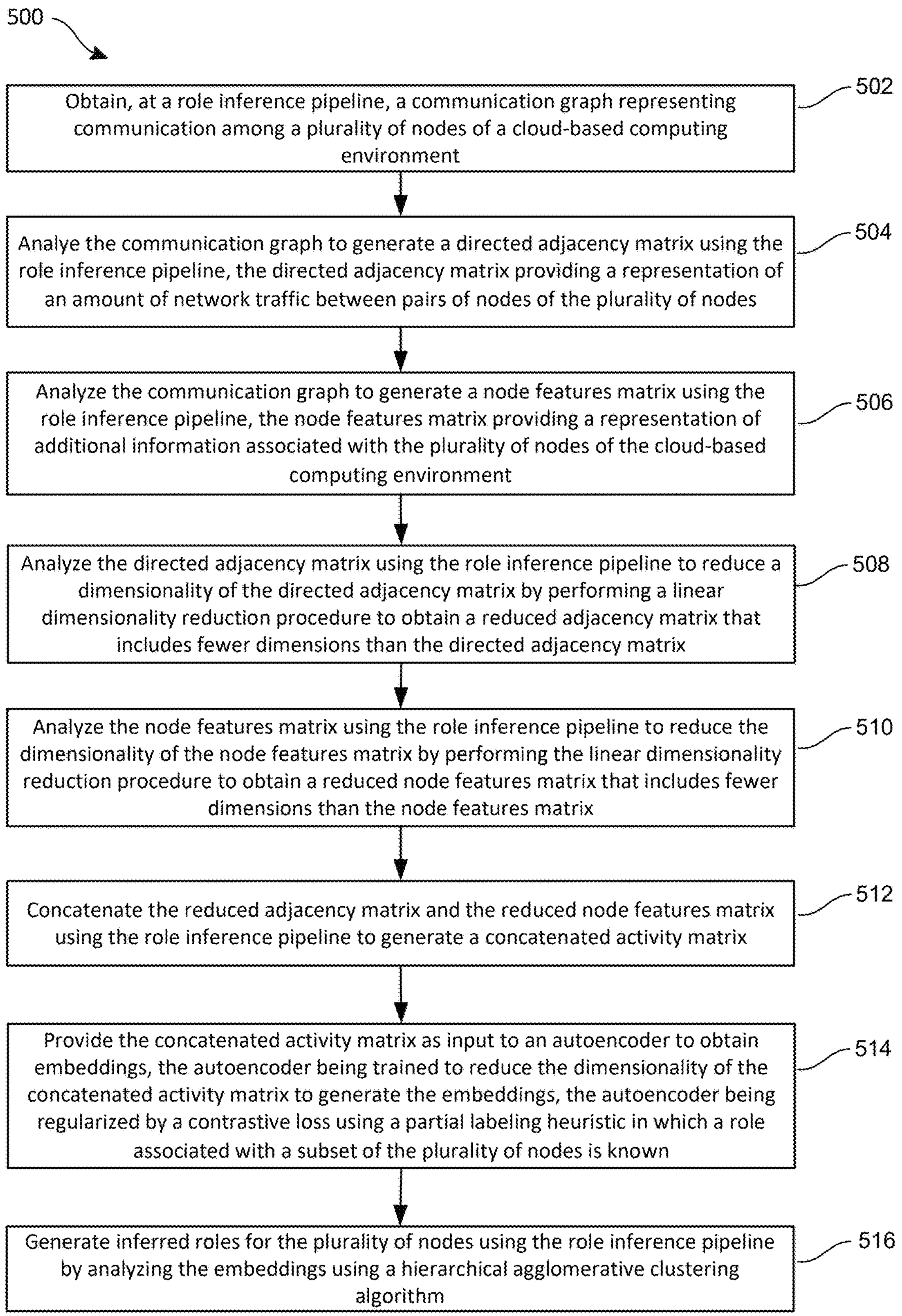
FIG. 5 is a flow chart of an example process for role inference according to the techniques disclosed herein.

FIG. 5 is a flow chart of an example process 500 for role inference according to the techniques disclosed herein. The process 500 can be implemented by the role inference pipeline 100 or the role inference pipeline unit 346 as discussed in the preceding examples.

The process 500 includes an operation 502 of obtaining, at a role inference pipeline, a communication graph representing communication among a plurality of nodes of a cloud-based computing environment. The communication graph can be generated by the communication graph pipeline unit 340 or obtained from the communication graph datastore 342.

The process 500 includes an operation 504 of analyzing the communication graph to generate a directed adjacency matrix using the role inference pipeline, the directed adjacency matrix providing a representation of an amount of network traffic between pairs of nodes of the plurality of nodes. The role inference pipeline 100 generates the directed agency matrix from the communication graph as discussed in the preceding examples.

The process 500 includes an operation 506 of analyzing the communication graph to generate a node features matrix using the role inference pipeline, the node features matrix providing a representation of additional information associated with the plurality of nodes of the cloud-based computing environment. The role inference pipeline 100 generates the node features matrix from the communication graph as discussed in the preceding examples.

The process 500 includes an operation 508 of analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix. The role inference pipeline 100 performs a PCA operation on the directed adjacency matrix to reduce the dimensionality of the matrix in some implementations. The role inference pipeline 100 may utilize other techniques for reducing the dimensionality of the directed adjacency matrix in other implementations.

The process 500 includes an operation 510 of analyzing the node features matrix using the role inference pipeline to reduce the dimensionality of the node features matrix. The role inference pipeline 100 reduces the dimensionality by performing a linear dimensionality reduction procedure to obtain a reduced node features matrix that includes fewer dimensions than the node features matrix. The role inference pipeline 100 performs a PCA operation on the node features matrix to reduce the dimensionality of the matrix in some implementations. The role inference pipeline 100 may utilize other techniques for reducing the dimensionality of the node features matrix in other implementations.

The process 500 includes an operation 512 of concatenating the reduced adjacency matrix and the reduced node features matrix using the role inference pipeline to generate a concatenated activity matrix. As discussed in the preceding examples, the role inference pipeline 100 concatenates these matrices before providing them as an input to the autoencoder.

The process 500 includes an operation 514 of providing the concatenated activity matrix as input to an autoencoder to obtain embeddings, the autoencoder being trained to reduce the dimensionality of the concatenated activity matrix to generate the embeddings, the autoencoder being regularized by a contrastive loss using a partial labeling heuristic in which a role associated with a subset of the plurality of nodes is known. As discussed in the preceding examples, the role inference pipeline unit 346 analyzes the concatenated activity matrix in operation 116 to generate the embeddings. The training of the autoencoder can also optionally include partial labels obtained by heuristics, external systems, and/or user inputs.

The process 500 includes an operation 516 of generating inferred roles for the plurality of nodes using the role inference pipeline by analyzing the embeddings using a hierarchical agglomerative clustering algorithm. As discussed in the preceding examples, the role inference pipeline 100 or the role inference pipeline unit 346 aggregate the embeddings as shown in FIG. 2 to cluster the nodes into inferred roles. Nodes having the same role are grouped together.

Once the roles have been inferred, one or more actions on the communication graph based on the inferred roles for the plurality of nodes. As discussed in the preceding examples, the native application 314 and/or the web application 390 can present a visualization of the graph to the user that has been generated by the visualization unit 348. The inferred roles can also be used to segment the plurality of nodes of the cloud-based computing environment into a plurality of micro-segments based on the inferred roles. The nodes associated with a microsegment are able to communicate with other nodes within the microsegment and to communicate with nodes outside the microsegment based on a security policy. A network administrator for a tenant can utilize the inferred roles to allocate resources to the micro-segment and define the security policies which control how nodes from one micro-segment may communicate with nodes in another micro-segment, if at all. This approach provides the network administrator with the ability to define a fine-grained security policy that can be used to limit the impact on the computing resources allocated to the tenant should a security breach occur. As a result, the breach can be contained to a single micro-segment. Other types of actions may be performed by the application services platform 310 based on the inferred roles determined in operation 516.

Figure 6:
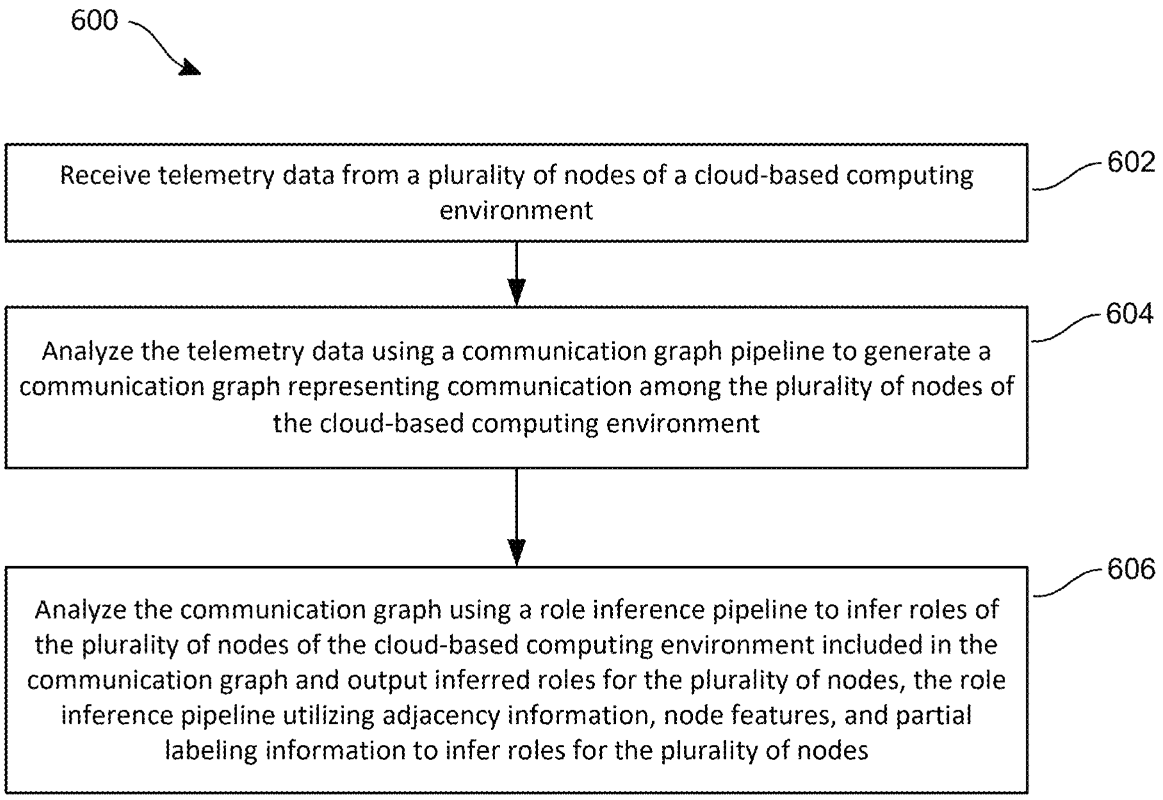
FIG. 6 is a flow chart of another example process for role inference according to the techniques disclosed herein.

FIG. 6 is a flow chart of another example process 600 for role inference according to the techniques disclosed herein. The process 600 can be implemented by the communication graph pipeline unit 340 and the role inference pipeline 100 or the role inference pipeline unit 346 as discussed in the preceding examples.

The process 600 includes an operation 602 of a receiving telemetry data from a plurality of nodes of a cloud-based computing environment. The telemetry data processing unit 334 receives the telemetry data from the telemetry data sources 332 and stores the telemetry data in the telemetry datastore 336 as discussed in the preceding examples.

The process 600 includes an operation 604 of analyzing the telemetry data using a communication graph pipeline to generate a communication graph representing communication among the plurality of nodes of the cloud-based computing environment. The communication graph pipeline unit 340 discussed above implements a communication graph pipeline that analyzes the telemetry data and constructs the communication graph.

The process 600 includes an operation 606 of analyzing the communication graph using a role inference pipeline 100 to infer roles of the plurality of nodes of the cloud-based computing environment included in the communication graph and output inferred roles for the plurality of nodes, the role inference pipeline utilizing adjacency information, node features, and partial labeling information to infer roles for the plurality of nodes. Additional details of how the role inference pipeline 100 operates are shown at least in FIGS. 1 and 2 and discussed above.

Once the roles have been inferred, various actions may be performed on the communication graph based on the inferred roles for the plurality of nodes. As discussed in the preceding examples, the native application 314 and/or the web application 390 can present a visualization of the graph to the user that has been generated by the visualization unit 348. The inferred roles can also be used to segment the plurality of nodes of the cloud-based computing environment into a plurality of micro-segments based on the inferred roles. The nodes associated with a microsegment are able to communicate with other nodes within the microsegment and to communicate with nodes outside the microsegment based on a security policy. A network administrator for a tenant can utilize the inferred roles to allocate resources to the micro-segment and define the security policies which control how nodes from one micro-segment may communicate with nodes in another micro-segment, if at all. This approach provides the network administrator with the ability to define a fine-grained security policy that can be used to limit the impact on the computing resources allocated to the tenant should a security breach occur. The breach can be contained to a single micro-segment. Other types of actions may be performed by the application services platform 310 based on the inferred roles determined in operation 516.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
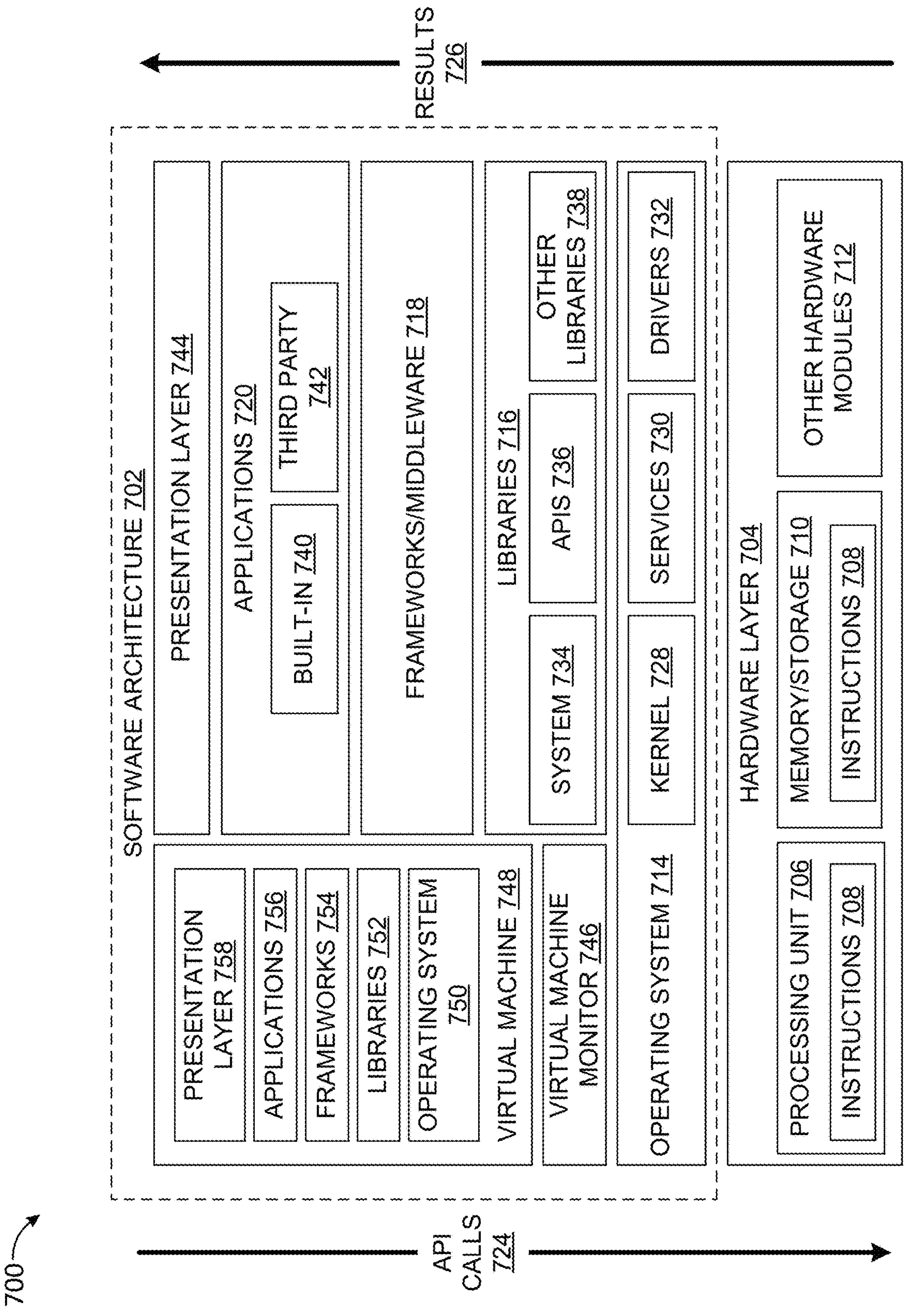
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory/storage 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks/middleware 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks/middleware 718 provide a higher-level common infrastructure that may be used by the applications 720 and/or other software modules. For example, the frameworks/middleware 718 may provide various graphic user interface (GUI) functions, high-level resource management, or high-level location services. The frameworks/middleware 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks/middleware 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
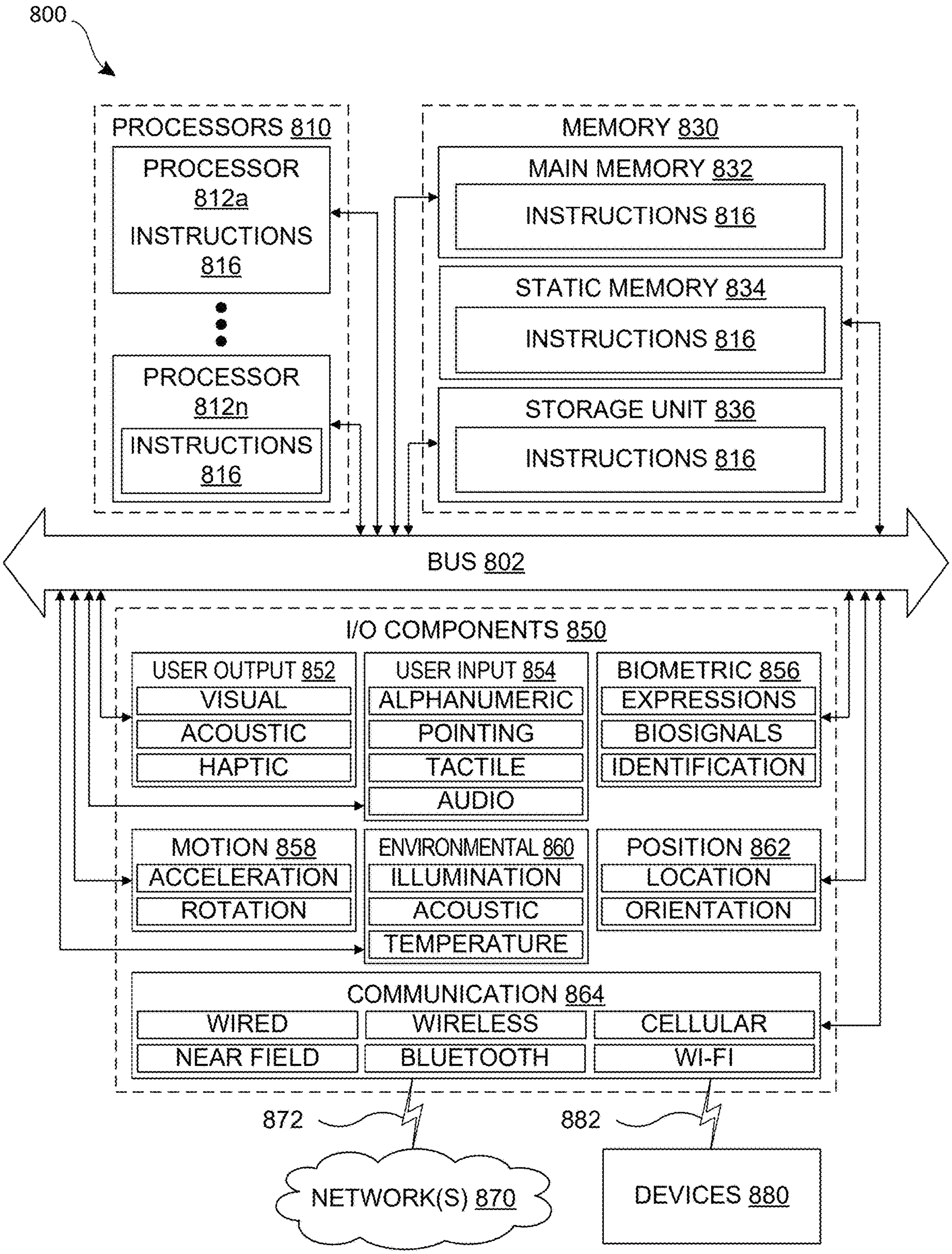
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory/storage 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multicore processor including cores that may execute instructions contemporaneously. Although FIG. 8 shows multiple processors, the machine 800 may include a single processor with a single core, a single processor with multiple cores (for example, a multicore processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

obtaining, at a role inference pipeline, a communication graph representing communication among a plurality of nodes of a cloud-based computing environment;

analyzing the communication graph to generate a directed adjacency matrix using the role inference pipeline, the directed adjacency matrix providing a representation of an amount of network traffic between pairs of nodes of the plurality of nodes;

analyzing the communication graph to generate a node features matrix using the role inference pipeline, the node features matrix providing a representation of additional information associated with the plurality of nodes of the cloud-based computing environment;

analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix;

analyzing the node features matrix using the role inference pipeline to reduce the dimensionality of the node features matrix by performing the linear dimensionality reduction procedure to obtain a reduced node features matrix that includes fewer dimensions than the node features matrix; and generating inferred roles for the plurality of nodes by combining the reduced adjacency matrix and the reduced node features matrix to generate combined matrices and analyzing the combined matrices using a hierarchical agglomerative clustering algorithm.

2. The data processing system of claim 1, wherein to generate the inferred roles for the plurality of nodes, the memory further includes instructions configured to cause the processor alone or in combination with other processors to perform operations of:

concatenating the reduced adjacency matrix and the reduced node features matrix using the role inference pipeline to generate a concatenated activity matrix;

providing the concatenated activity matrix as input to an autoencoder to obtain embeddings, the autoencoder being trained to reduce the dimensionality of the concatenated activity matrix to generate the embeddings; and generating inferred roles for the plurality of nodes using the role inference pipeline by analyzing the embeddings using a hierarchical agglomerative clustering algorithm.

3. The data processing system of claim 2, wherein the autoencoder being regularized by a contrastive loss using a partial labeling heuristic in which a role associated with a subset of the plurality of nodes is known.

4. The data processing system of claim 2, wherein each node of the plurality of nodes is selected from among an Internet Protocol (IP) address of a component of the cloud-based computing environment, a service, a Kubernetes pod, or an IP-port tuple.

5. The data processing system of claim 2, wherein the linear dimensionality reduction procedure comprises a principal component analysis (PCA).

6. The data processing system of claim 2, wherein the memory further includes instructions configured to cause the processor alone or in combination with other processors to perform operations of:

receiving feedback from a user of the cloud-based computing environment indicating that a role of one or more modes of the inferred roles was incorrect; and using the feedback in a contrastive loss function used to regularize behavior of the autoencoder.

7. The data processing system of claim 1, wherein the additional information associated with the plurality of nodes is selected from among main ports used by the nodes, statistical information of connections between nodes, a number of graphlets, motifs, or in which a respective node is included.

8. The data processing system of claim 1, wherein the memory further includes instructions configured to cause the processor alone or in combination with other processors to perform operations of:

performing one or more actions on the communication graph based on the inferred roles for the plurality of nodes.

9. The data processing system of claim 8, wherein performing the one or more actions on the communication graph based on the inferred roles for the plurality of nodes further comprises:

generating a visualization of the communication graph based on the inferred roles for the plurality of nodes.

10. The data processing system of claim 8, wherein performing the one or more actions on the communication graph based on the inferred roles for the plurality of nodes further comprises:

segmenting the plurality of nodes of the cloud-based computing environment into a plurality of micro-segments based on the inferred roles, wherein nodes associated with a microsegment are able to communicate with other nodes within the microsegment and to communicate with nodes outside the microsegment based on a security policy.

11. A method implemented in a data processing system for performing role inference for nodes of a communication graph, the method comprising:

obtaining, at a role inference pipeline, a communication graph representing communication among a plurality of nodes of a cloud-based computing environment;

analyzing the communication graph to generate a directed adjacency matrix using the role inference pipeline, the directed adjacency matrix providing a representation of an amount of network traffic between pairs of nodes of the plurality of nodes;

analyzing the communication graph to generate a node features matrix using the role inference pipeline, the node features matrix providing a representation of additional information associated with the plurality of nodes of the cloud-based computing environment;

analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix;

analyzing the node features matrix using the role inference pipeline to reduce the dimensionality of the node features matrix by performing the linear dimensionality reduction procedure to obtain a reduced node features matrix that includes fewer dimensions than the node features matrix; and generating inferred roles for the plurality of nodes by combining the reduced adjacency matrix and the reduced node features matrix to generate combined matrices and analyzing the combined matrices using a hierarchical agglomerative clustering algorithm.

12. The method of claim 11, wherein generating the inferred roles for the plurality of nodes further comprises:

concatenating the reduced adjacency matrix and the reduced node features matrix using the role inference pipeline to generate a concatenated activity matrix;

providing the concatenated activity matrix as input to an autoencoder to obtain embeddings, the autoencoder being trained to reduce the dimensionality of the concatenated activity matrix to generate the embeddings; and generating inferred roles for the plurality of nodes using the role inference pipeline by analyzing the embeddings using a hierarchical agglomerative clustering algorithm.

13. The method of claim 12, wherein the autoencoder being regularized by a contrastive loss using a partial labeling heuristic in which a role associated with a subset of the plurality of nodes is known.

14. The method of claim 12, wherein each node of the plurality of nodes is selected from among an Internet Protocol (IP) address of a component of the cloud-based computing environment, a service, a Kubernetes pod, or an IP-port tuple.

15. The method of claim 12, wherein the linear dimensionality reduction procedure comprises a principal component analysis (PCA).

16. A data processing system comprising:

a processor; and a memory storing executable instructions that, when executed, cause the processor alone or in combination with other processors to perform operations of:

receiving telemetry data from a plurality of nodes of a cloud-based computing environment;

analyzing the telemetry data using a communication graph pipeline to generate a communication graph representing communication among the plurality of nodes of the cloud-based computing environment;

analyzing the communication graph using a role inference pipeline to infer roles of the plurality of nodes of the cloud-based computing environment included in the communication graph and output inferred roles for the plurality of nodes, the role inference pipeline utilizing adjacency information, node features, and partial labeling information to infer roles for the plurality of nodes;

analyzing the communication graph to generate a directed adjacency matrix using the role inference pipeline, the directed adjacency matrix providing a representation of an amount of network traffic between pairs of nodes of the plurality of nodes; and analyzing the directed adjacency matrix using the role inference pipeline to reduce a dimensionality of the directed adjacency matrix by performing a linear dimensionality reduction procedure to obtain a reduced adjacency matrix that includes fewer dimensions than the directed adjacency matrix.

17. The data processing system of claim 16, wherein the memory further includes instructions configured to cause the processor alone or in combination with other processors to perform operations of:

analyzing the communication graph to generate a node features matrix using the role inference pipeline, the node features matrix providing a representation of additional information associated with the plurality of nodes of the cloud-based computing environment; and analyzing the node features matrix using the role inference pipeline to reduce the dimensionality of the node features matrix by performing the linear dimensionality reduction procedure to obtain a reduced node features matrix that includes fewer dimensions than the node features matrix.

18. The data processing system of claim 17, wherein the memory further includes instructions configured to cause the processor alone or in combination with other processors to perform operations of:

concatenating the reduced adjacency matrix and the reduced node features matrix using the role inference pipeline to generate a concatenated activity matrix; and providing the concatenated activity matrix as input to an autoencoder to obtain embeddings, the autoencoder being trained to reduce the dimensionality of the concatenated activity matrix to generate the embeddings, the autoencoder being regularized by a contrastive loss using a partial labeling heuristic in which a role associated with a subset of the plurality of nodes is known.

19. The data processing system of claim 18, wherein the memory further includes instructions configured to cause the processor alone or in combination with other processors to perform operations of:

generating inferred roles for the plurality of nodes using the role inference pipeline by analyzing the embeddings using a hierarchical agglomerative clustering algorithm.

20. The data processing system of claim 19, wherein the memory further includes instructions configured to cause the processor alone or in combination with other processors to perform operations of:

generating a visualization of the communication graph based on the inferred roles for the plurality of nodes.

* * * * *